United States Patent [19]

Suzuki et al.

[11] 4,115,817

[45] Sep. 19, 1978

[54] DEVICE INCLUDING A UNIT FOR FEEDING A RECORDING MEDIUM AT A PREDETERMINED SPEED TO A UNIT FOR PROCESSING THAT PROVISIONAL RECORD INTO A FINAL ONE WHICH IS FORMED ON THE MEDIUM FED AT ANOTHER SPEED

[75] Inventors: Etsuo Suzuki; Hidekazu Sakurai, both of Tokyo, Japan

[73] Assignee: Nippon Electric Co., Ltd., Tokyo, Japan

[21] Appl. No.: 770,972

[22] Filed: Feb. 22, 1977

[51] Int. Cl.² .................. H04N 1/12; H04N 1/31
[52] U.S. Cl. ..................... 358/288; 346/153; 354/83; 355/28; 358/296; 358/304
[58] Field of Search .......... 358/288, 296, 304; 346/153; 354/83; 355/28

[56] References Cited

U.S. PATENT DOCUMENTS

| 3,646,256 | 2/1972 | Jacob | 358/288 |
| 3,665,486 | 5/1972 | Sato | 346/153 |
| 3,741,651 | 6/1973 | Nishiyama | 355/28 |

Primary Examiner—Howard W. Britton

Attorney, Agent, or Firm—Sughrue, Rothwell, Mion, Zinn and Macpeak

[57] ABSTRACT

In a facsimile receiver comprising a recording unit for forming a latent image on a continuous recording medium fed by a variable speed feed unit and a developing and fixing unit for processing the latent image into a visible one, a controllable feed unit and a store unit are arranged successively prior to the processing unit. When fed to the controllable feed unit by the variable speed feed unit, the continuous sheet is held by the former so as to heap in the store unit. Responsive to a page end signal, a cutter disposed prior to the store unit cuts the continuous sheet into a separate sheet and a remaining continuous sheet. The separate sheet is now fed by the controllable feed unit to the processing unit at a predetermined speed. The recording medium may be one of stacked separate sheets, when the controllable feed unit feeds the above-mentioned one separate sheet a predetermined interval after the separate sheet is fed thereto by the variable speed feed unit. This invention is applicable also to a device where a provisional record of a pattern formed on a recording medium fed with a preselected one of various speeds should be processed into a final record with the medium fed at a predetermined speed.

9 Claims, 5 Drawing Figures

DEVICE INCLUDING A UNIT FOR FEEDING A RECORDING MEDIUM AT A PREDETERMINED SPEED TO A UNIT FOR PROCESSING THAT PROVISIONAL RECORD INTO A FINAL ONE WHICH IS FORMED ON THE MEDIUM FED AT ANOTHER SPEED

BACKGROUND OF THE INVENTION

This invention relates to a device for disposing of a recording medium by forming thereon a provisional record of a pattern, such as a picture, and by thereafter processing the provisional record into a final record of the pattern. The device may be, for example, an electrostatic facsimile receiver.

In a facsimile transmission and reception system, a transmitter supplies a receiver or receivers with signals representative of a picture or the like. In a conventional electrostatic facsimile receiver, a continuous recording paper is caused to pass by a recording unit for forming thereon latent images of a plurality of successive pictures and is subsequently fed into a developing and fixing unit for developing and fixing the latent images into visible reproductions of the respective pictures. In such a receiver, particularly for the known runlength-coded signals or for similar signals with redundancy reduction, the speed at which the recording paper runs by the recording unit towards the developing and fixing unit is adjusted in compliance with the speed selected at the transmitter in consideration of the density of lines or the like of each picture. As a result of the variation in the speed of feed, unevenness or irregularity in developing and fixing has been unavoidable to deteriorate the reproduced pictures. Deterioration of a record has been inevitable also in a device for disposing of a continuous sheet or separate sheets of recording medium when the medium is caused to pass by a recording unit towards a provisional record processing unit with various speeds of feed.

SUMMARY OF THE INVENTION

It is therefore an object of the present invention to provide a device for disposing of a recording medium with excellent results.

It is another object of this invention to provide a device for disposing of a recording medium by forming a provisional record on the recording medium fed with a speed selected for best possible formation of the provisional record and by thereafter processing the provisional record into a final record, wherein the processing is carried out with excellent results despite the variation in the selected speed of feed.

A device for processing a recording medium having a leading edge, to which device this invention is applicable, comprises variable speed feed means for feeding the recording medium along a predetermined path with a preselected one of a plurality of speeds, means for recording a provisional record of a pattern on the recording medium being fed by the feeding means, and means forwardly along the path of the feeding means and the recording means for processing the provisional record into a final record of the pattern. In accordance with this invention, the device further comprises store means between the processing means and one of the variable speed feed means and the recording means that is nearer to the processing means to be put normally in a first position for guiding the recording medium fed thereto by said variable speed feed means towards said processing means and controllably in a second position for storing the recording medium fed thereto by the variable speed feed means controllable feed means for further feeding the stored recording medium to the processing means, and control means for controlling said store means and said controllable feed means. The controllable feed means comprises a feed roller transversely of the path, a cooperating member put normally in a first location for disengaging with the roller and controllably in a second location for engaging therewith, and controllable drive means put controllably in a first mode of operation for making the feed roller feed at a predetermined speed the recording medium put between the feed roller and normally in a second mode of operation for rendering the feed roller to feed nothing. The control means comprises detector means along the path at a predetermined distance from the feed roller for detecting passage thereby of the leading edge of the recording medium fed by the variable speed feed means to produce a start signal, first means responsive to the start signal for putting the cooperating member into the second location and the store means into the second position, second means for putting said controllable drive means into the first mode of operation a first predetermined interval after the last-mentioned leading edge reaches the feed roller, and third meand for putting the cooperating member back into the first location, the store means back into the first position, and the controllable drive means back into the first mode of operation approximately a second predetermined interval after production of the start signal, the second predetermined interval being longer than the first predetermined interval.

DESCRIPTION OF THE PREFERRED EMBODIMENTS

Figure 1:
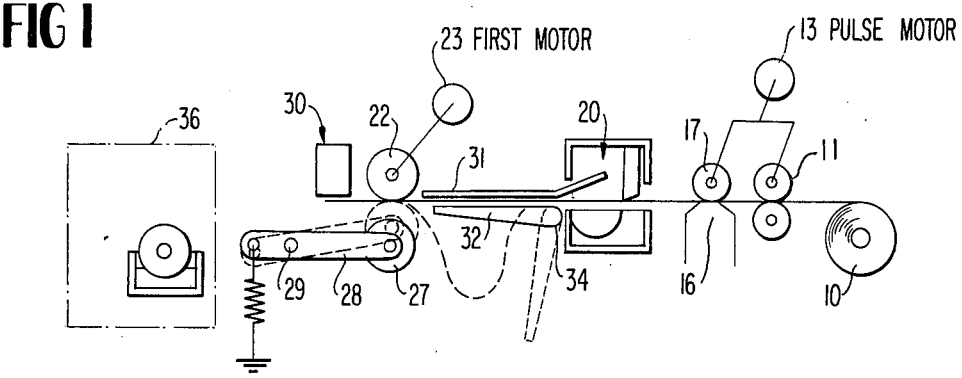
FIG. 1 is a schematic side view of an electrostatic facsimile receiver according to a first embodiment of the present invention.

Referring to FIG. 1, an electrostatic facsimile receiver according to a first embodiment of the present invention is for disposing of, in response to signals transmitted from a cooperating transmitter or similar transmitters (not shown), a continuous sheet of recording medium supplied from a roll 10 thereof. The recording medium is fed by a first feed roller 11 along a predetermined substantially horizontal path of feed. The first feed roller 11 is driven by a pulse motor 13 and cooperates with an unnumbered roller. The pulse motor 13 receives a train of pulse signals included in the signals transmitted from the transmitter and makes the first feed roller 11 feed the recording medium at a speed determined by the frequency of the pulse signals. Forwardly along the path of the first feed roller 11, a recording head 16 is disposed for forming on the recording medium latent images of successive pictures or equivalents in response to facsimile signals received from the transmitter. A pinch roller 17 cooperating with the recording head 16 is driven by the pulse motor 13 in synchronism with the first feed roller 11. Generally, the pulse signal frequency is preselected in consideration of the line density or the like of each picture being transmitted. The first feed roller 11 thus serves as a principal element of a variable speed feed unit for feeding the recording medium with a preselected one of a plurality of speeds. The recording head 16 may obviously placed backwardly of, or prior to, the first feed roller 11. A cutter 20 is positioned along the path to cut those portions of the recording medium which have latent images of the respective pictures thereon into separate sheets in response to page end signals sent from the transmitter.

Further referring to FIG. 1, the forward or leading edge of the continuous recording medium before cut in each instance passes by a second feed roller 22 disposed transversely of the path and driven by a first controllable electric motor 23. A tension roller 27 is swingable in a manner later described so as to be selectively held in a first location illustrated with solid lines of disengaging with the second feed roller 22 and in a second location depicted by broken lines of engaging therewith. To be so swingable, the tension roller 27 is carried by a swingable arm 28 which has a first slightly rotatable stud 29 fixed thereto and an end biassed by a tension spring. In a manner also described hereunder, the first controllable electric motor 23 is operable selectively in a first mode of making the second feed roller 22 feed the recording medium put between the second feed roller 22 and the tension roller 27 held in the second location at a predetermined speed and in a second mode of not feeding the last-mentioned recording medium. The second feed roller 22, first controllable electric motor 23, and tension roller 27 thus serve as principal elements of a controllable feed or drive unit operable selectively in a first phase of letting the recording medium fed thereto by the variable speed feed unit freely pass thereby, a second phase of holding the last-mentioned recording medium, and a third phase of further feeding the last-mentioned recording medium at the predetermined speed towards a detecting unit 30 positioned at a predetermined distance from the second feed roller 22 for optically or otherwise detecting whether or not the recording medium is present adjacently thereof. It is not important that the member cooperating with the second feed roller 22 be a roller.

Referring again to FIG. 1, the facsimile receiver further comprises a first guide 31 and a second guide 32 between the cutter 20 and the second feed roller 22. The first guide 31 is positioned above the path substantially parallel thereto. The second guide 32 is located beneath the path and comprises a swingable plate having a movable and a fixed end. The fixed end is defined by a pair of second slightly rotatable studs 34 (only one being illustrated) fixed to the swingable plate. In a manner later described, the second guide 32 is held selectively in a first and a second position illustrated by solid and broken lines, respectively. When held in the first position, the second guide 32 is substantially parallel to the first guide 31 and cooperates therewith in guiding the recording medium fed between the first and second guides 31-32 by the variable speed feed unit to the second feed roller 22. When held in the second position, the second guide 32 or, more particularly, the movable end in the example being illustrated, is put away from the first guide 31 to let the recording medium fed by the variable speed feed unit and put between the second feed roller 22 and the tension roller 25 held in the second location with the first controllable electric motor 23 deenergized heap or sag due to the gravity between the controllable feed unit held in the second phase of operation and that one of the variable speed feed unit and the recording head 16 which is nearer to the first and second guides 31-32. Contrary to the depicted arrangement, the first and second guides 31-32 may be placed beneath and above the path, respectively. The path need not be directed horizontal. The second guide 32 may translate instead of being swingable. In any event, the guides 31-32 serve as principal elements of a storing unit for temporarily storing the recording medium fed thereto by the variable speed feed unit and held by the controllable feed unit put in the second phase. The controllable speed and the storing units serve as principal elements of a store-feed unit for carrying out the above-mentioned storage and for further feeding at the predetermined speed the temporarily stored recording medium further by the detecting unit 30 to a developing and fixing unit 36 for developing the latent images of each picture into a visible image and for fixing the visible image. Generally speaking, the recording head 16 is for recording a provisional record of a pattern on the recording medium. The developing and fixing unit 36 is for processing the provisional record into a permanent or final record of the pattern.

Figure 2:
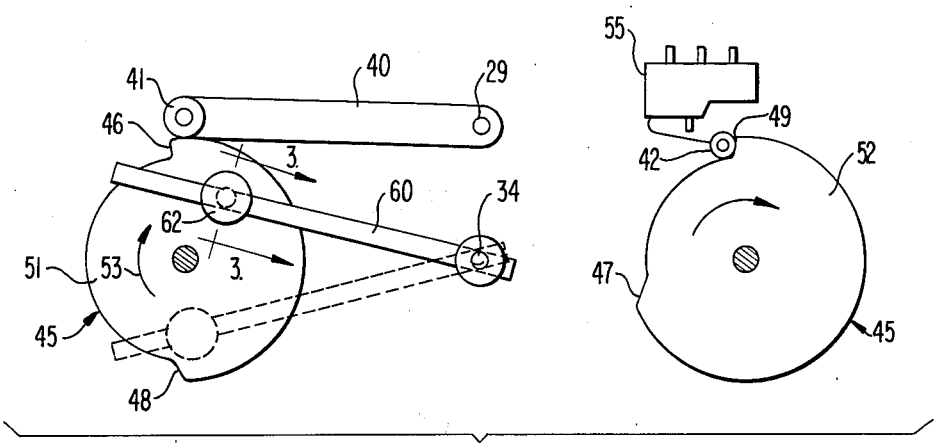
FIG. 2 is an enlarged and exploded front view of a device for operating a store-feed unit in the facsimile receiver illustrated in FIG. 1.
Figure 3:
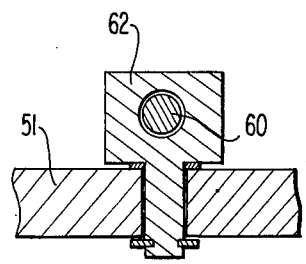
FIG. 3 is a further enlarged axial sectional view of a portion of the store-feed unit operating device taken on a plane indicated by a line 3—3 in FIG. 2.

Referring to FIG. 1 once again and to FIGS. 2 and 3 afresh, the first slightly rotatable stud 29 fixed to the swingable arm 28 is fixed, in turn, to one end of a rod 40 having a first cam follower 41 at the other end. The tension roller 27 is thus coupled to the first cam follower 41. The first cam follower 41 and a second cam follower 42 follow a cam member 45 rotatable around a fixed axis and has first, second, third, and fourth points 46, 47, 48, and 49. In the example being illustrated, the cam member 45 comprises a first plate cam 51 having the first and third points 46 and 48 for the first cam follower 41 and a second plate cam 52 having the second and fourth points 47 and 49 for the second cam follower 42. The plate cams 51-52 are rotated in a counterclockwise sense of rotation symbolized by an arrow 53. A two-state device, such as a microswitch 55 is coupled to the second cam follower 42 so as to produce a first and a second signal when the first cam follower 42 follows the second cam plate 52 from the second point 47 to the fourth point 49 and from the fourth point 49 to the second point 47, respectively. The second slightly rotatable studs 34 of the second guide 32 are fixed to one end of a lever 60, whose other end portion is slidably carried, as best shown in FIG. 3, by a support 62 freely rotatably fixed to a side face of the first cam plate 51. During about a first one-third of one complete rotation of the cam member 45 from the depicted position, the microswitch 55 produces the second signal. The first cam follower 41 passes through the first point 46 to put and hold the tension roller 27 in the second location (broken lines). The second guide 32 is moved to the second position (broken lines). When the cam member 45 is further rotated so that the second cam follower 42 passes through the second point 47, the microswitch 55 produces the first signal instead of the second. When the first cam follower 41 passes through the third point 48, the tension roller 27 is put back into the first location. When the second cam follower 42 passes through the fourth point 49, the microswitch 55 again produces the second signal in place of the first. In the meanwhile, the second guide 32 is put back to and held in the first position (solid line).

Figure 4:
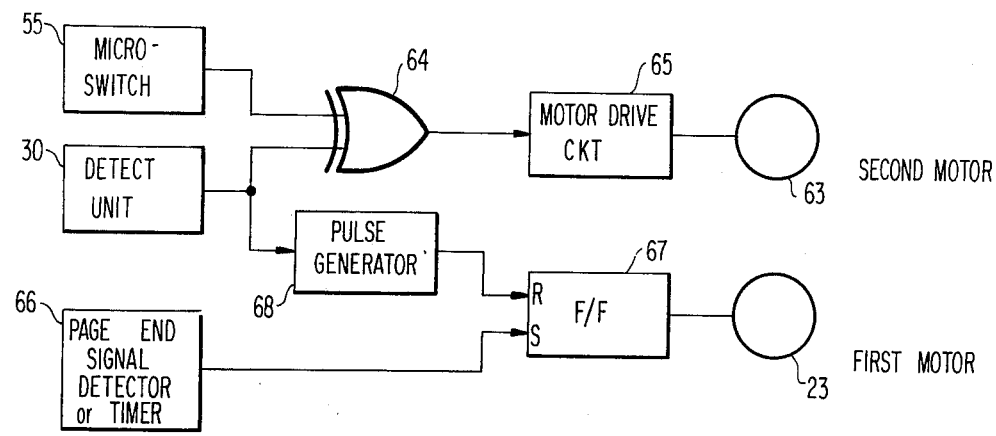
FIG. 4 is a block diagram of a circuit for driving the facsimile receiver shown in FIG. 1.

Referring also to FIG. 4, the facsimile receiver still further comprises a second controllable electric motor 63 for the cam member 45 and a control circuit for controlling the first and second controllable electric motors 23 and 63 in timed relation to operation of the cutter 20. The detecting unit 30 produces a first binary signal that varies from a logic "0" value into a logic "1" value when the leading edge of the separate recording sheet arrives thereat and varies from the logic "1" value to the logic "0" value when the trailing edge passes away therefrom. The leading edges of the logic "0" and "1" signals may be called a start signal and an operation end signal, respectively. The microswitch 55 may produce a second binary signal whose logic "1" and "0" values serve as the first and second signals. The circuit comprises an Exclusive OR gate 64 responsive to the first and second binary signals for producing a third binary signal, which energizes and deenergizes a known motor drive circuit 65 for the second controllable electric motor 63 by its logic "1" and "0" values. The control circuit thus starts the second motor 63 to rotate the cam member 45 in response to the start signal produced when the leading edge of the continuous recording medium reaches the detector unit 30 and when the microswitch produces the second signal. Rotation of the cam member 45 makes the second cam follower 42 passes through the second point 47, when the microswitch 55 produces the first signal to suspend drive of the second motor 63. The tension roller 27 is held in the second location to hold the recording member. The second guide 32 is held in the second position to make the recording medium heap.

Further referring to FIGS. 1, 2, and 4, the page end signal is produced by a known page end signal detector 66 to put the cutter 20 into operation while the recording medium is heaping in the store unit. The control circuit further comprises an electrically settable device, such as a flip-flop circuit 67, coupled to the first controllable electric motor 23. The flip-flop circuit 67 is operable in a first or set state of energizing the first motor 23 and in a second state of deenergizing the motor 23. The control circuit still further comprises a first connection directly connecting the page end signal detector 66 and the flip-flop circuit 67 to energize the first motor 23 and a pulse generator 68 as a second connection for supplying a pulse to the flip-flop circuit 67 to deenergize the first motor 23 in response to each of the start and operation end signals produced by the detecting unit 30. The second feed roller 22 does not rotate, therefore, upon production of the start signal. As soon as a separate sheet is cut from the continuous recording medium, the second feed roller 22 feeds the separate sheet until the detecting unit produces the operation end signal to stop the rotation of the second feed roller 22 and to restart rotation of the cam member 45. The first cam follower 41 now passes through the third point 48 to put the tension roller 27 and the second guide 32 back to the first location and position. Subsequently, the second cam follower 42 passes through the fourth point 49, when the cam member 45 stops in the illustrated position. The cam member 45, the control circuit, and the related members thus serve as a control unit for putting the controllable feed unit from the first phase into the second as soon as the start signal is produced. The control unit puts the controllable feed unit from the second phase into the third and from the third back to the first a first and a second predetermined interval, respectively, after production of the start signal. The first predetermined interval is given by that timing of the page end signal which is determined in compliance with the length of the picture along the path of feed. The second predetermined interval is longer than the first predetermined interval by an interval for the first cam follower 41 to follow the cam member 45 to the third point 48 from the instant of production of the operation end signal and is determined by a timing drive device comprising the first cam plate 51, second controllable electric motor 63, and Exclusive OR gate 64. The operation end signal, as called herein, is for an end of drive of the second feed roller 22 rather than an end of the whole operation for each separate sheet of the facsimile receiver. The detecting unit 30 may be placed between the second feed roller 22 and the guides 31-32. At any rate, it is possible to deem the start and operation end signals to be produced substantially upon arrival at the second feed roller 22 of the leading edge of the continuous recording medium and the trailing or rear edge of each separate sheet cut from the recording medium, respectively.

Figure 5:
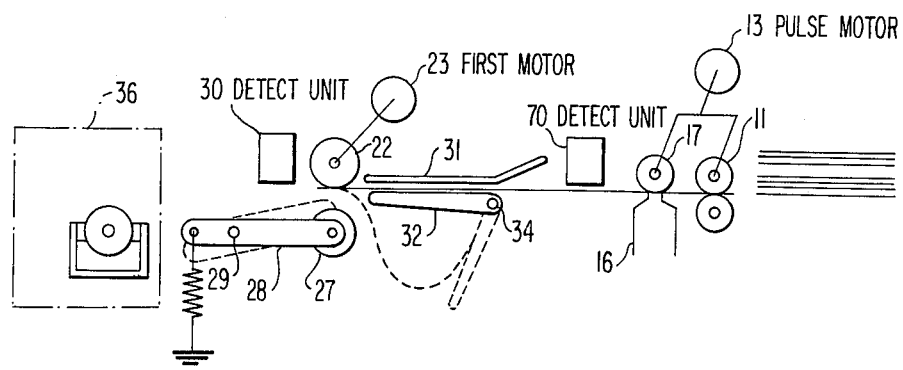
FIG. 5 is a schematic side view of an electrostatic facsimile receiver according to a second embodiment of this invention.

Turning now to FIG. 5, an electrostatic facsimile receiver according to a second embodiment of this invention in for separate sheets of recording medium rather than for a continuous sheet of recording medium. Similar parts are designated by like reference numerals as in FIG. 1. The facsimile receiver comprises a second detecting unit 70 between the second feed roller 22 and one of the variable speed feed unit and the recording head 16 that is nearer to the guides 31-32. The first feed roller 11 feeds the separate sheets one by one along the predetermined path in the manner known in the art. The second detector unit 70 optically or otherwise detects passage thereby of the trailing or rear edge of each separate sheet fed by the first feed roller 11 to produce the page end signal.

Finally referring to FIG. 4 again, an electrostatic facsimile receiver for separate sheets of recording medium may comprise a timer depicted by a block 66. The timer 66 may be a mechanical one or an electrical timing circuit known in the art and is operatively coupled to the detector unit 30 to produce the page end signal. The first predetermined interval is herein determined by an interval between an instant for the separate sheet fed by the first feed roller 11 to reach the second feed roller 22 and clamped thereat and another subsequent instant of production of the page end signal.

In connection with the embodiments described hereinabove, it is to be noted that the recording medium is temporarily stored in the store-feed unit and subsequently fed thereby towards the developing and fixing unit 36 at a predetermined speed. This avoids the undesirable unevenness and irregularity in developing the latent image into a visible image and fixing the latter despite the fact that the latent image is formed on the recording medium fed with a preselected one of a plurality of speeds. Furthermore, the guides 31-32 enables the recording medium fed by the variable speed feed unit to heap between the second feed roller 22 and that one of the variable speed feed unit and the recording head 16 which is nearer to the second feed roller 22. This makes it possible to shorten the distance between the recording head 16 and the developing and fixing unit 36.

This invention is generally applicable to a device for disposing of a recording medium by feeding the recording medium at a preselected one of a plurality of speeds, recording a provisional record of a pattern, and by thereafter processing the provisional record into a final record of the pattern, wherein it is desirable to carry out the processing with the recording medium fed at a predetermined speed. It is obviously possible to modify the control device, particularly, the cam member 45 and the coupling therewith of the controllable feed unit and the store unit. For example, another lever, similar the lever 60, may be substituted for the rod 40. The cam member 45 may be a single cylindrical cam having two indents for providing the first through fourth points 46–49.

What is claimed is:

1. A device for processing a recording medium having a leading edge, comprising variable speed feed means for feeding the recording medium along a predetermined path with a preselected one of a plurality of speeds, means for recording a provisional record of a pattern on the recording medium being fed by said feed means, means forwardly along said path of said feeding means and said recording means for processing said provisional record into a final record of said pattern, store means between said processing means and one of said variable speed feed means and said recording means that is nearer to said processing means to be put normally in a first position for guiding the recording medium fed thereto by said variable speed feed means towards said processing means and controllably in a second position for storing the recording medium fed thereto by said variable speed feed means, controllable feed means for further feeding the stored recording medium to said processing means, and control means for controlling said store means and said controllable feed means, wherein:

said controllable feed means comprises a feed roller transversely of said path, a cooperating member put normally in a first location of disengaging with said roller and controllably in a second location of engaging therewith, and controllable drive means put controllably in a first mode of operation for making said feed roller feed at a predetermined speed the recording medium put between said feed roller and normally in a second mode of operation for rendering said feed roller to feed nothing;

said control means comprising detector means along said path at a predetermined distance from said feed roller for detecting passage thereby of the leading edge of the recording medium fed by said variable speed feed means to produce a start signal, first means responsive to said start signal for putting said cooperating member into said second location and said store means into said second position, second means for putting said controllable drive means into said first mode of operation a first predetermined interval after the last-mentioned leading edge reaches said feed roller, and third means for putting said cooperating member back into said first location, said store means back into said first position, and said controllable drive means back into said first mode of operation approximately a second predetermined interval after production of said start signal, said second predetermined interval being longer than said first predetermined interval.

2. A device as claimed in claim 1, the recording medium fed by said feed roller at said predetermined speed being a separate sheet of recording medium having said leading edge and a trailing edge, said detector means being capable also of detecting passage thereby of the trailing edge of the separate sheet fed by said feed roller to produce an operation end signal, wherein:

said control means further comprises electrically settable means coupled to said controllable drive means and being set selectively in a first state for putting said controllable drive means in said first mode of operation and normally in a second state for putting said controllable drive means in said second mode of operation;

said second means comprising page end means operatively coupled to said feed roller for producing a page end signal said first predetermined interval after the last-mentioned leading edge reaches said feed roller, and first connection means between said page end means and said settable means for setting said settable means into said first state from said second state in response to said page end signal;

said third means comprising timing drive means coupled to said detector means and said cooperating means for determining said second predetermined interval after production of said start signal to move said cooperating member from said second location back to said first location said second predetermined interval after production of said start signal, and second connection means between said detector means and said settable means for putting said settable means from said first state back into said second state in response to said operation end signal, said second predetermined interval being not longer than an interval between production of said start and said operation end signals.

3. A device as claimed in claim 2, wherein said store means comprises a first guide along said path and a second guide movable between a first position substantially parallel to said first guide to cooperate therewith in guiding the recording medium fed between said first and second guides by said variable speed feed means to said feed roller from said one of said variable speed feed means and said recording means and a second position away from said first guide to let the recording medium fed by said variable speed feed means and put between said feed roller and said cooperating member held in said second location heap between said one of said variable speed feed means and said recording means, on the one hand, and said feed roller and said cooperating member held in said second location, on the other hand, said timing drive means being further coupled to said second guide to move said second guide from said first position to said second position in response to said start signal and from said second position back to said first position approximately said second predetermined interval after production of said start signal.

4. A device as claimed in claim 2, the recording medium being a continuous sheet of recording medium, said device further comprising a cutter between said storing means and said one of said variable speed feed means and said recording means for cutting said continuous sheet into said separate sheet and a remaining portion of said continuous sheet in response to said page end signal.

5. A device as claimed in claim 2, the recording medium fed by said variable speed feed means being said separate sheet, wherein said page end means comprises second detector means between said storing means and said one of said variable speed feed means and said recording means for detecting passage thereby of the trailing edge of said separate sheet fed by said variable speed feed means to produce said page end signal.

6. A device as claimed in claim 2, the recording medium fed by said variable speed feed means being said separate sheet, wherein said page end means comprises a timer coupled to said detecting means and said first connection means for producing said page end signal said first predetermined interval after production of said start signal.

7. A device as claimed in claim 2, wherein said timing drive means comprises a two-state device for producing a first and a second signal, cam means rotatable around a fixed axis and having a first, a second, a third, and a fourth point, a first cam follower which is coupled to said cooperating member and follows said cam means passing through said first and third points to move said cooperating member from said first location to said second location and from said first location back to said first location on passing through said first and third points, respectively, a second cam follower which is coupled to said two-state device and follows said cam means passing through said second and fourth points to make said two-state device produce said first and second signals while following from said second point to said fourth point and from said fourth point to said second point, respectively, an electric motor for rotating said cam means, and a control circuit coupled to said detector means and said two-state device for starting said motor in response to said start signal produced during presence of said second signal to make said first cam follower follow said cam means passing through said first point, for suspending rotation by said motor of said cam means when said second cam follower passes through said second point, for restarting said motor in response to said operation end signal produced during presence of said first signal to make said first cam follower pass through said third point, and for stopping said motor when said second cam follower passes through said fourth point.

8. A device as claimed in claim 7, said detector means producing a first binary signal variable between logic "1" and "0" values, said start signal being a leading edge of the binary signal of a predetermined one of the logic "1" and "0" values that continues until production of said operation end signal, said operation end signal being a leading edge of the binary signal of the other of the logic "1" and "0" values that continues until production once again of the start signal, said two-state device producing a second binary signal variable between the logic "1" and "0" values, said first and second signals being said second binary signal of said one and said other of the logic "1" and "0" values, respectively, wherein said control circuit comprises an Exclusive OR gate responsive to said first and second binary signals for producing a third binary signal variable between the logic "1" and "0" values, and a motor drive circuit connected to said Exclusive OR gate for driving said motor when said third binary signal is of the logic "1" value.

9. A device as claimed in claim 8, wherein said second connection means comprises a pulse generator responsive to the leading edges of the first binary signal of the logic "1" and "0" values for putting said settable means from one of said first and second states to the other thereof.

* * * * *